Oct. 21, 1930.  L. D. SOUBIER  1,778,775
APPARATUS FOR DELIVERING CHARGES OF MOLTEN GLASS
Filed May 2, 1924
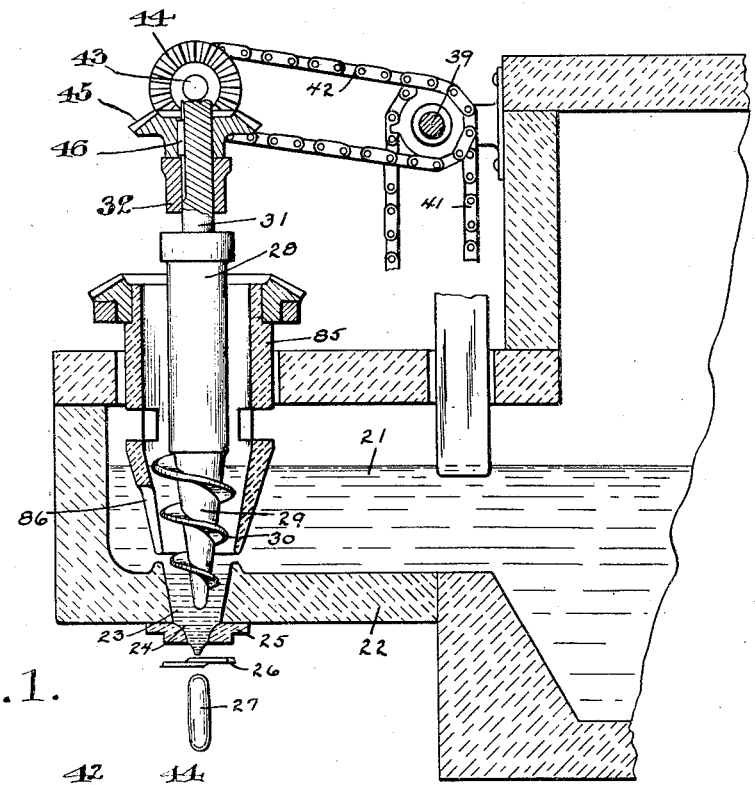
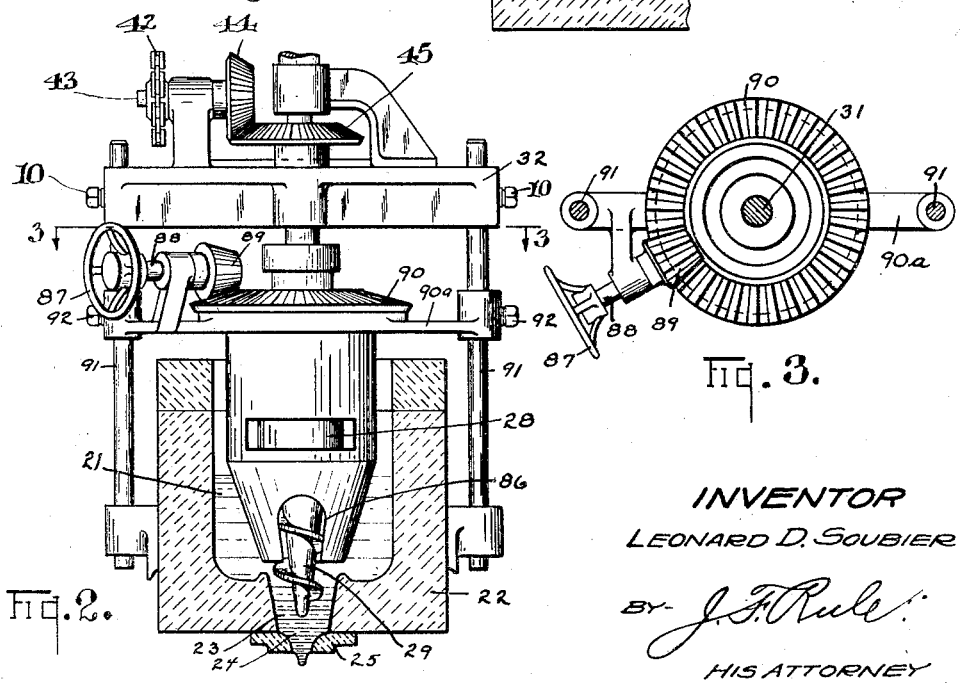
INVENTOR
LEONARD D. SOUBIER
BY J. F. Rule
HIS ATTORNEY Patented Oct. 21, 1930

1,778,775

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

APPARATUS FOR DELIVERING CHARGES OF MOLTEN GLASS

Application filed May 2, 1924. Serial No. 710,488.

My invention relates to apparatus for feeding molten glass through an outlet in a container, controlling the flow, and delivering the glass in the form of individual charges or gobs, adapted for entering the molds of a forming machine. In feeders of this type at present in use, the discharge of glass is ordinarily controlled by a vertically reciprocating plug or regulator projecting into the glass above the outlet. The plug during its downward movement exerts an expelling force on the glass, and during its upward movement exerts an upward pull or retarding force on the glass at the outlet. The time during which an expelling force is applied to the glass is thus confined to the time during which the plug is moved downward. The retarding action, in like manner, takes place during the upward stroke.

An object of the present invention is to provide a practical form of apparatus comprising a regulating device operable to exert an expelling force on the issuing glass, which is not dependent upon and limited to a downward movement of the regulator, and which may be extended over any desired periods. If desired, this expelling force may be made continuous.

A further feature of the invention relates to the provision of a regulator provided with a screw thread or spiral surface which may be utilized in applying either an expelling or retarding action on the glass. Such action may be effected by a relative rotation of the container and regulator, preferably a rotation of the regulator. Moreover, the rotation of the regulator may be either intermittent or continuous, depending upon the particular results desired.

A further object obtained by the use of a spiral or screw threaded regulator, consists in the circulation of the glass thereby, such circulation being around the axis of the outlet, so that stagnation or one-sided chilling of the glass is prevented.

Other objects of the invention will appear hereinafter.

In the accompanying drawings:

Figure 1 is a sectional side elevation of a construction embodying one form of the invention comprising a screw plug and means for rotating it.

Figure 2 is a part sectional front elevation of the same.

Figure 3 is a sectional plan view taken at the line III—III on Figure 2.

Referring to the drawings, the molten glass 21 is continuously supplied to the furnace boot or extension 22 having a well or passageway 23 in the floor thereof, terminating in an outlet opening 24 formed in a bushing 25 at the bottom of said well. The glass, as it issues, is suspended from the walls of the outlet and is periodically severed by shears 26 permitting the formed charges or gobs of glass 27 to drop.

The discharge of the glass is controlled by a regulator 28 made of fire clay or other refractory material. The lower portion of this plug or regulator is in the form of a screw, comprising a tapered core 29 surrounded by an integral spiral thread 30. The regulator is provided with a stem 31 preferably made of metal, which has a bearing in a stationary yoke 32 mounted on vertical standards 91 on the supporting frame of the boot.

The yoke 32 is adjustable vertically on the standards 91 and is secured in adjusted position by set screws 10. There is thus provided means for adjusting the regulator 28 vertically.

Means are provided for rotating the regulator about its vertical axis either intermittently or continuously at either a constant or variable speed. Such means comprises a drive shaft 39 to which motion is imparted through a sprocket wheel and chain 41. Motion is transmitted from the shaft 39 through a sprocket chain 42 to a shaft 43 mounted on the yoke 32 and carrying a bevel pinion 44 running in mesh with a gear 45 on the stem 31. A key 46 in the gear 45 is slidable vertically in a keyway in the stem 31, thereby permitting vertical adjustment of the regulator.

By rotating the drive shaft 39 continuously, a continuous rotation is imparted to the regulator. If the latter is rotated in a counter-clockwise direction, the spiral thread 30 will exert a constant downward or expelling force on the issuing glass. This expelling force augments the force of gravity and tends to produce a substantially constant flow independently of the varying amount of glass suspended from the walls of the outlet. As is well understood by those versed in the art, the tendency of glass flowing by gravity from an outlet is first to flow comparatively slowly, producing a knob or ball of glass below the outlet. The downward movement of the glass is gradually accelerated under the influence of gravity, causing the flow to break into a stream of comparatively small diameter and rapid movement. By the use of the screw plug or regulator rotating as above described, the rate at which the glass issues is maintained comparatively constant, and the diameter of the descending column or stream substantially uniform, so that when periodically severed by the shears 26, the charges or gobs 27 are substantially symmetrical and of uniform diameter throughout their length. Moreover, owing to the expelling force of the regulator, the glass can be discharged through a smaller outlet 24 than is practical or possible without the use of the regulator. This smaller diameter of opening results in a gob of better shape for many purposes than is obtainable with a larger opening. It will be observed that the screw plug projects down into the well 23, thus confining the glass to a certain extent. This tends to a stabilize or maintain the flow of glass constant, independent of variations in the temperature or viscosity of the glass, the amount suspended from the outlet, etc. The expelling force may be varied by varying the speed at which the regulator is rotated and may also be varied by adjusting the regulator up or down.

In some instances, it may be desirable to reverse the direction of rotation and thereby exert a retarding action on the issuing glass. The rotation of the regulator in addition to exerting an expelling or retarding action, also has a stirring action on the glass, by which it is caused to circulate about the axis of the outlet, thereby maintaining or producing a more homogeneous condition, preventing stagnation or one-side chilling of the glass.

A sleeve member or tubular casing 85 surrounds the regulator 28 and projects downward into the glass. The lower end of the sleeve 85 is spaced a short distance above the floor of the boot. A lateral opening or openings 86 formed in the side wall of the sleeve, permit the entrance of the glass. The sleeve 85 is rotatively adjustable by means of a hand wheel 87 on a shaft 88 which carries a pinion 89 in mesh with a gear 90 fixed to the sleeve 85. The opening 86 may thus be adjusted to any position around the plug, thereby controlling the path of flow of the glass. By having the said opening at the front side of the regulator, the main portion of the issuing glass is caused to flow forward to the front end of the boot before it is discharged, thereby preventing stagnation and cooling of the glass in front of the regulator, and insuring a uniform temperature and homogeneity of the issuing glass. The sleeve 85 is also adjustable vertically. For this purpose, it is carried on a yoke 90ª adjustable up and down on the standards 91 and held in adjusted position by set screws 92. This vertical adjustment regulates the amount of glass permitted to enter the well 23 through the annular passage formed between the lower end of the sleeve and the floor of the boot. This has a material effect in controlling the size and shape of the charges of glass.

What I claim is:

1. The combination of a container for molten glass having an outlet opening in the bottom thereof, means for supplying glass to the container, a tapered screw threaded plug projecting downward into the glass over the outlet, and a tapered sleeve surrounding said plug.

2. The combination of a container for molten glass having an outlet opening in the bottom thereof, means for supplying glass to the container, a tapered screw-threaded plug projecting downward into the glass over the outlet, means for rotating said plug to expel glass from said outlet, a tapered sleeve surrounding said plug, and means for relatively moving said plug and sleeve axially to vary the clearance therebetween without interrupting the rotation of the plug.

3. The combination of a container for molten glass having an outlet opening in the floor thereof, a tapered sleeve aligned with said opening and adjustable axially in respect thereto whereby to vary the distance between the bottom of the sleeve and the upper surface of the floor of the container adjacent said opening, a tapered screw-threaded plug located within the sleeve and having a portion projecting downwardly beyond the bottom of the sleeve and into the outlet opening.

4. The combination of a container for molten glass having an outlet opening in the bottom thereof, means for supplying glass to the container, a tapered screw-threaded plug projecting downward into the glass over the outlet, a tapered sleeve surrounding said plug and provided with an opening adjacent the base thereof, a gear ring fast to the upper end of said sleeve, vertical standards adjacent the container, a cross-head carried by said standards providing a support for said plug, driving mechanism for continuously rotating said plug to expel glass from the outlet mounted on the crosshead, means for adjusting the cross-head on said standards to raise and lower the plug without interrupting its driving mechanism, a second cross-head carried by said standards providing a support for said sleeve, means for adjusting said second cross-head on said standards to raise and lower the sleeve without interrupting the rotation of said plug, and manually operable means carried by said second cross-head and engaging said gear ring for rotatably adjusting said sleeve to any desired position without interrupting the rotation of said plug.

Signed at Toledo, in the county of Lucas and State of Ohio, this 30th day of April, 1924.

LEONARD D. SOUBIER.